United States Patent
Mustonen (10) Patent No.: US 9,461,966 B2
(45) Date of Patent: Oct. 4, 2016

(54) METHOD AND APPARATUS FOR RATING URLS

(75) Inventor: Kimmo Olavi Mustonen, Espoo (FI)

(73) Assignee: F-SECURE OYJ, Helsinki (FI)

( * ) Notice: Subject to any disclaimer, the term of this patent is extended or adjusted under 35 U.S.C. 154(b) by 605 days.

(21) Appl. No.: 12/387,923

(22) Filed: May 8, 2009

(65) Prior Publication Data

US 2010/0287151 A1    Nov. 11, 2010

(51) Int. Cl.
*G06F 17/30* (2006.01)
*H04L 29/06* (2006.01)
*H04L 29/08* (2006.01)

(52) U.S. Cl.
CPC ..... *H04L 63/0227* (2013.01); *G06F 17/30864* (2013.01); *G06F 17/30876* (2013.01); *H04L 63/1441* (2013.01); *H04L 67/20* (2013.01)

(58) Field of Classification Search
CPC .............. G06F 17/30864; G06F 17/30867; G06F 17/30876; H04L 63/0227; H04L 63/1441; H04L 67/20
USPC .............................. 707/600–831; 3/600–831
See application file for complete search history.

(56) References Cited

U.S. PATENT DOCUMENTS

| | | | |
|---|---|---|---|
| 2004/0031058 A1* | 2/2004 | Reisman | 725/112 |
| 2005/0144297 A1 | 6/2005 | Dahlstrom et al. | 709/229 |
| 2006/0031407 A1* | 2/2006 | Dispensa et al. | 709/219 |
| 2008/0163380 A1 | 7/2008 | Liu | 726/28 |

FOREIGN PATENT DOCUMENTS

WO    WO 2005/106715 A2    11/2005

OTHER PUBLICATIONS

Alexander Behm et al., Answering Approximate String Queries on Large Data Sets Using External Memory, 2011, IEEE, 888-899.*

* cited by examiner

*Primary Examiner* — Jean B Fleurantin
(74) *Attorney, Agent, or Firm* — Harrington & Smith (57) ABSTRACT

A method of providing rating information in respect of Uniform Resource Identifiers to a client terminal. The method includes identifying a Uniform Resource Identifier at the client terminal, sending a first query to a rating server over an IP network, the query including as a query string a first component of the identified Uniform Resource Identifier or a derivative of that first component, and receiving the first query at the rating server and determining whether or not a rating exists for the query string. A response is sent by the server to the client terminal, the response including a determined rating, or an indication that no rating exists. The response is received at the client terminal and, if a rating included in the response so indicates or if the response otherwise so indicates, then a further query is sent to the rating server, the further query including as a query string said first component and a second component of the identified Uniform Resource Identifier, or a derivative of the first and second components. The steps of receiving the first query at the rating server, sending a response, and receiving the response at the client terminal, are repeated one or more times as required, adding for each iteration a further component to the query string.

19 Claims, 4 Drawing Sheets

METHOD AND APPARATUS FOR RATING URLS

TECHNICAL FIELD

The present invention relates to a method and apparatus for rating Uniform Resource Locators (URLs). More particularly, the invention relates to a method and apparatus for rating URLs in a client-server based architecture according to which a multiplicity of clients request URL ratings from a common server or server set.

BACKGROUND

Whilst providing a great many benefits to individuals and organisations, the Internet can be a source of both hidden and known dangers. On the one hand, much of the content available on the Internet is of an undesirable nature, whilst on the other web pages can be a source of malware including spyware, trojans, viruses, etc. One mechanism for defending against these problems is to perform a rating on Uniform Resource Locators (URLs) entered into a web browser on a client terminal, and to present the rating information to the user before downloading the associated web page and/or filter access requests in dependence upon the rating results.

US2008/0163380 describes one such approach involving URL ratings. This involves providing a URL Rating Server which maintains a database of known URLs and their ratings. Client terminals request ratings from the Rating Server, for example prior to downloading a web page. In order to reduce waiting times on the client side, a URL cache is built up in the client terminal based both on previously accessed and trusted URLs, and pre-populated URL rating data obtained, for example, based on a user's profile.

Known approaches to providing URL ratings using a client-server approach suffer from the disadvantages that the database of rated URLs must be extremely large, and that it is extremely difficult to maintain a reliable database given the ever-changing nature of the Internet. The massive growth in web 2.0 sites in particular causes a significant problem for conventional URL rating systems given that dubious and dangerous content can be introduced to the Internet and subsequently removed over extremely short time periods. In fact, known approaches are to a large extent ineffective in view of the changing use patterns now seen with the Internet.

SUMMARY

It is an object of the present invention to overcome or at least mitigate the above noted disadvantages of known YRL rating methods. This is achieved, at least in part, by seeking to identify rated URLs that match component parts of URLs that clients seek to rate. Such rated URLs may be provided to clients to transfer at least a part of the computational load, required to rate a URL, from a back-end server to the clients.

According to a first aspect of the present invention there is provided a method of providing rating information in respect of Uniform Resource Identifiers to a client terminal, the method comprising:

1) identifying a Uniform Resource Identifier at the client terminal;
2) sending a first query to a rating server over an IP network, the query including as a query string a first component of the identified Uniform Resource Identifier or a derivative of that first component;
3) receiving the first query at the rating server and determining whether or not a rating exists for the query string;
4) sending a response including a determined rating, or an indication that no rating exists, to the client terminal;
5) receiving the response at the client terminal and, if a rating included in the response so indicates or if the response otherwise so indicates, then sending a further query to the rating server, the further query including as a query string said first component and a second component of the identified Uniform Resource Identifier, or a derivative of the first and second components;
6) repeating steps 3) to 5) one or more times as required, adding for each iteration a further component to the query string.

Embodiments of the present invention may, in a large number of cases, reduce the time taken to rate a URL. Rating of a full URL may be required in only a limited number of cases.

The queries sent to the rating server may contain derivatives of the respective query strings, each derivative being obtained by applying a hashing function to the corresponding query string.

Said first component may comprises a registered domain name or registered IP address. Said second and any further component may comprise further sub-components prefixed to said first component.

The method may involve, at the rating server, if it is determined that a rating exists for the query string and that a second or further component is required to refine the rating, including in the response a format definition for a further query.

The method may involve, upon receipt of a response at the client terminal, caching in a local cache any determined rating together with the associated query string or derivative. At the rating server, if it is determined that a rating exists for the query string and that a second or further component is required to refine the rating, a format definition for a further query may be included in the response and additionally cached in the local cache the format definition.

The method may comprise, between steps 1) and 2), querying said local cache to determine whether or not it contains an entry for a component of the Uniform Resource Identifier or a derivative of that component and, if not, then including that component or its derivative as said first component or its derivative in said first query, and, if so, then presenting the rating to a user and/or constructing said query string of said first query according to a specified format definition.

In an embodiment of the invention, the client terminal comprises a web browser and the method further comprises displaying in a web browser window a determined rating. The method may comprise the further steps of:

if a rating received by the client terminal indicates that the Uniform Resource Identifier is trusted, then downloading the data from that Uniform Resource Identifier into a web browser window, and if a rating received by the client terminal indicates that the Uniform Resource Identifier is malicious, then blocking the downloading of data from that Uniform Resource Identifier into a web browser window.

The Uniform Resource Identifier or a derivative of the Uniform Resource Identifier may be included in said first query sent to the rating server. In this case, the method may comprise, at said rating server, determining whether or not a rating exists for the Uniform Resource Identifier or its derivative prior to determining whether or not a rating exists for the query string and, if so, then returning a response containing the rating, to the client terminal.

According to a second aspect of the present invention there is provided a method of providing rating information in respect of Uniform Resource Identifiers to a client terminal. The method comprises receiving at the client terminal from a network server, ratings in respect of Uniform Resource Identifiers, and caching the received ratings at the client terminal within a client cache. The method further comprises for a Uniform Resource Identifier identified at the client terminal for which a rating is required, querying the client cache to determine whether or not it contains a rating for a Uniform Resource Identifier matching a first component of the identified Uniform Resource Identifier, in dependence upon the result, extending the first component with a second component of the identified Uniform Resource Identifier and either conducting a further query of the client cache with the extended Uniform Resource Identifier or sending a query to the rating server.

The extended Uniform Resource Identifier may correspond to the identified Uniform Resource Identifier.

The method of the second aspect may comprise further extending the extended URI in dependence upon further results and repeating the query of the client cache or sending a query to the rating server.

A query sent to the rating server may contain the complete identified Uniform Resource Identifier.

According to a third aspect of the present invention there is provided a computer program for causing a computer to perform the steps of:

1) identifying a Uniform Resource Identifier at the client terminal;
2) sending a first query to a rating server over an IP network, the query including as a query string a first component of the identified Uniform Resource Identifier or a derivative of that first part;
3) receiving a response at the client terminal and, if a rating included in the response so indicates or if the response otherwise so indicates, then sending a further query to the rating server, the further query including as a query string said first component and a second component of the identified Uniform Resource Identifier, or a derivative of the first and second components;
4) repeat steps 2) and 3) one or more times as required, adding for each iteration a further component to the query string;
5) depending upon a final rating or the absence of a rating, either allowing the client terminal to access data identified by the Uniform Resource Identifier or preventing access to that data or requesting a user decision.

According to a fourth aspect of the present invention there is provided computer-readable recording medium having stored thereon instructions for causing a computer to:

1) identify a Uniform Resource Identifier at the client terminal;
2) send a first query to a rating server over an IP network, the query including as a query string a first component of the identified Uniform Resource Identifier or a derivative of that first part;
3) receive a response at the client terminal and, if a rating included in the response so indicates or if the response otherwise so indicates, then sending a further query to the rating server, the further query including as a query string said first component and a second component of the identified Uniform Resource Identifier, or a derivative of the first and second components;
4) repeat steps 2) and 3) one or more times as required, adding for each iteration a further component to the query string;
5) depending upon a final rating or the absence of a rating, either allow the client terminal to access data identified by the Uniform Resource Identifier or prevent access to that data or request a user decision.

According to a fifth aspect of the present invention there is provided method of providing ratings in respect of Uniform Resource Identifiers to client terminals, the method comprising:

1) maintaining at or in association with a server, a cache containing ratings for Uniform Resource Identifiers;
2) receiving at the server, from a client terminal, a query containing a queried Uniform Resource Identifier;
3) identifying a first component of said queried Uniform Resource Identifier and determining whether or not said cache contains an entry for a Uniform Resource Identifier matching said first component;
4) if the cache contains an entry which indicates that a further Uniform Resource Identifier component is required to rate the queried Uniform Resource Identifier, then identifying such a second component and determining whether or not the cache contains an entry for a Uniform Resource Identifier which matches said first and second components;
5) repeating step 4) as required with the inclusion of further components until either a final rating is obtained or it is determined that the queried Uniform Resource Identifier cannot be rated;
6) returning the determined ratings to the client terminal including any ratings determined for intermediate Uniform Resource Identifiers.

DETAILED DESCRIPTION

Figure 1:
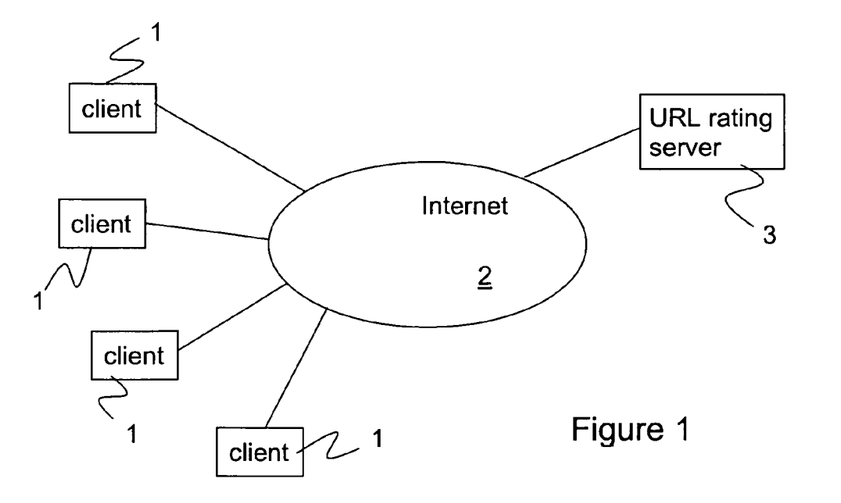
FIG. 1 illustrates schematically a network architecture over which a URL rating service is provided.

There is illustrated in FIG. 1 a typical client-server architecture for providing a URL rating service. A multiplicity of client terminals 1 (which may be mobile phones, PDAs, laptops, PCs etc) are able to access the Internet 2 via some appropriate access network(s) (not shown in the Figure). Also coupled to the Internet is an ORSP FE (URL) rating server 3 operated by a third party service provider, e.g. a vendor of antivirus and security products and services. Each terminal is typically provided with a web browser that allows a user to download, view, and interact with web pages. A web browser is also provided with certain new functionality for optimising the rating process and enhancing the user experience. This functionality will now be described.

Every URL is made up of some combination of the following: a scheme name or resource type, a registered domain name or Internet Protocol (IP) address, the port number, the pathname of the file to be fetched or the program to be run, the query string including query parameters, and, with html files, an anchor for where the page should be displayed at. The combined syntax may be as follows:

resource_type://domain:port/filepathname?query_string#anchor.

As has been noted above, even where a domain name or (IP) address is trusted, as is the case for example with "youtube.com" or "wikipedia.com", content behind the domain name or IP address may not. It is also possible that the same web page may be pointed to by a (large) number of different URLs.

It is possible to reduce the number of rating queries that a client sends to the URL rating server by identifying those URL components behind which all URLs are trusted (or not trusted), and caching these at the client. When a user enters a URL into a browser, appropriate components of the URL are compared against the cached components. If a match is found, the cached rating can be presented to the user, or filtering action taken, without the need for the client to send a query to the rating server. Only if a match is not found need a query be sent.

Figure 2:
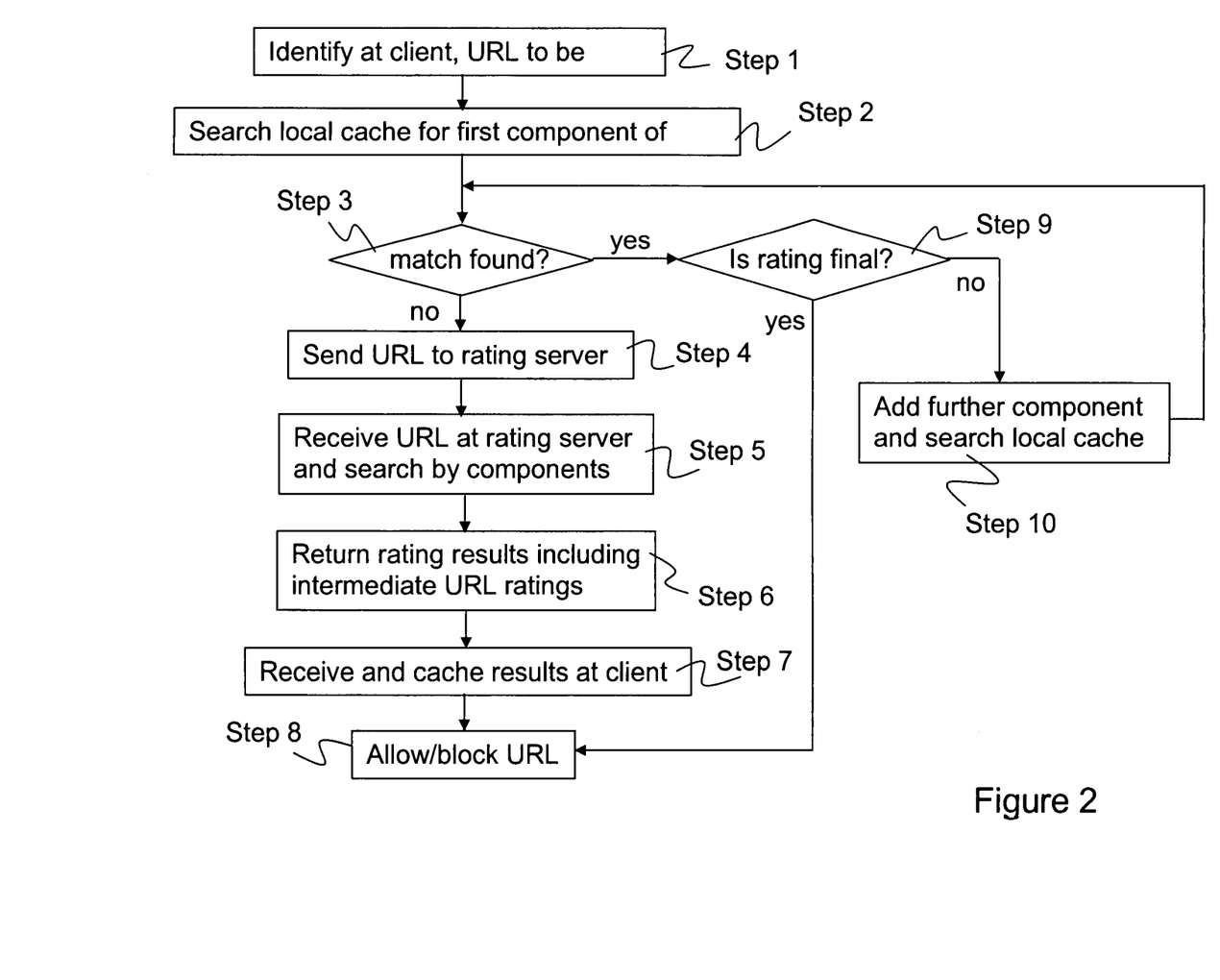
FIG. 2 is a flow diagram illustrating a first URL rating procedure involving a rating server parsing a URL for previously rated components.

It would be possible to build the cache at the client by causing the client to send a complete URL to the rating server in the event that a match is not found. This process is illustrated in FIG. 2, where (at steps 1 to 3, 9 and 10) the client terminal determines whether a local URL rating cache contains an entry for a component of the URL. If not, the client sends the URL to the rating server (step 4). The rating server could then split the URL into various components and compare those components against the contents of its database (step 5). The rating server would then return (step 6) to the client one or more components together with their ratings. The results are received and cached by the client (step 7), and the URL allowed or blocked accordingly (step 8). So, for example, if a user enters the URL:

http://www.marks-clerk.com/uk/attorneys/publications/articles.html and no matches for the URL or its component parts are found in the local cache, the URL is sent to the URL rating server. In this case, the rating server parses the URL and determines that all URLs behind the "marks-clerk.com" domain level are trusted, and returns the result to the client. It is not necessary that the URL rating server maintain any rating data for specific URLs behind the marks-clerk.com domain level. The same is true for a malicious domain name, i.e. it is only necessary to maintain an entry for the domain level and not for any URLs behind that domain level. For a domain level that is itself trusted but for which URLs behind the domain level are not, e.g. "youtube.com", the rating server should maintain ratings for those URLs (at least to a level where trust/non-trust has been established).

Improved lookup speeds may be obtained by storing hashes of URL components, and generating corresponding hashes from the received URL. The client cache also contains hashes. The client may, in addition to the plaintext URL, include in the query a hash of the URL components up to the point that it does not find a match in the local cache. The rating server then commences the search from that hash onwards. Only matches that are not previously known to the client are returned to it by the rating server.

In order to provide a very quick initial check, the client may send a hash of the complete URL to the rating server together with the plaintext URL. The rating server performs a quick search for the hash, and if the result is that the URL is trusted or not trusted, this is returned immediately to the client. Only if a match for the hash is not found by the rating server is a search performed using the URL components.

Whilst this approach may work in principle, in practice it opens a security threat as it is necessary for the client to send the complete URL in plain text in order to allow the URL rating server to parse the URL. In some instances, a URL may contain sensitive data such as a user's bank username and password. Whilst some approaches to URL rating require that the client cipher the sent URL, e.g. by applying a hashing function over the URL and sending only the result, this is not possible with the approach described in the preceding paragraph as the URL rating server will be unable to parse the URL components where the URL is previously unknown to the rating server. If ciphering is used, then the rating server must store a rating for each and every (rated) URL.

Figure 3:
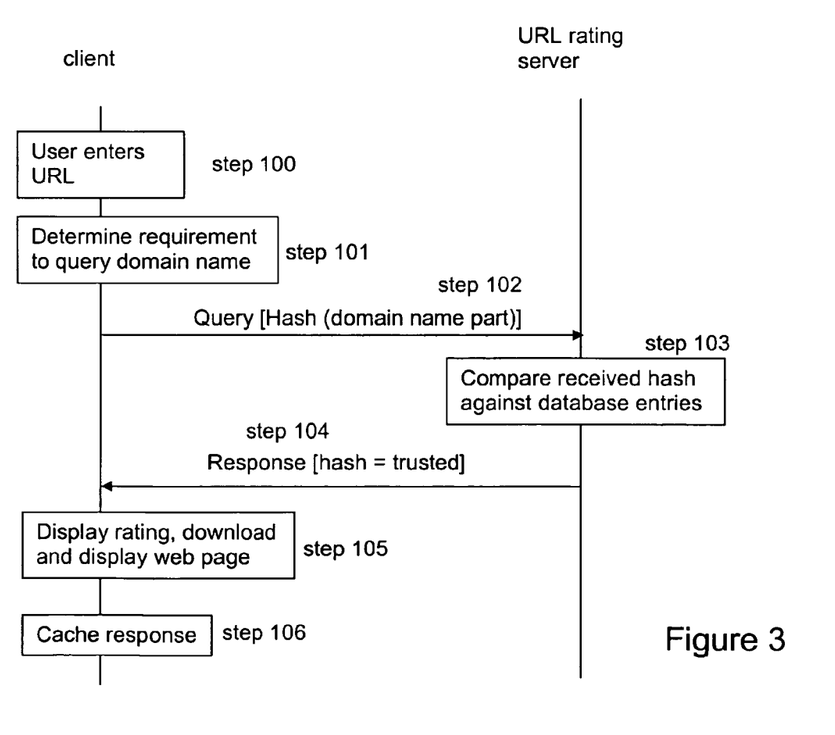
FIG. 3 illustrates a sequence for performing an improved rating procedure in which a client terminal parses a URL and sends sub-queries to a rating server in respect of URL components.

A solution to this problem is to break up the URL query into a number of sub-queries. This approach is illustrated in FIG. 3, where a user first enters a URL (step 100) into the address line of the browser (or clicks on a web link). In the case of the example considered above, and again assuming that the client, using the client cache, is unable to rate the URL, the client determines (step 101) that it must send to the rating server a query containing the domain level "marks-clerk.com". The client applies a rule set in this step in order to take account of hierarchical top level domain name structures such a ".co.uk". Rather than send the domain name part in plain text, the client sends only a hash of the component (step 102). Upon receipt of the query, an ORSP Front End (FE) at the rating server compares (step 103) the received hash against a database of hashes corresponding to rated URLs. In this example, the hash of "marks-clerk.com" is present in the database, together with a "trusted" rating. The rating server responds to the client (step 104) with the rating. The client presents the rating to the user and downloads the requested web page (step 105). In addition, the hash of the domain name part is stored, together with the rating, in the client cache (step 106). The user can now freely surf all URLs behind the "marks-clerk.com" domain without any further queries having to be sent to the URL rating server.

Consider now the case where the user enters a URL of a community (web 2.0) website into the browser. The following sequence illustrates such a situation:

1. The user goes to http://www.youtube.com/watch?v=1234.
2. The client queries the root "." domain with the client cache. The client cache maintains a rule set for handling such queries. In this case, it returns an instruction to query again with the format "<top-level domain>".
3. The client queries the client cache again using the ".com" top level domain, and the client cache returns an instruction to query again with the format "<xxx>.com".
4. The client queries the client cache again using the ".youtube.com" domain.
5. The client cache returns the result that a hash of the domain level is not contained within the cache.
6. The client then forwards the query to the ORSP FE server, which returns the answer that the domain level "*.youtube.com*" is trusted by default, but requesting the first part of the path".
7. The client forwards a query to the ORSP FE server containing a hash of "*.youtube.com/watch*", and receives a response that "*.youtube.com/watch*" is trusted by default, but requesting the 'v' parameter".

8. The client forwards a query to the ORSP FE server containing a hash of "*.youtube.com/watch?v=1234*", and receives a response that "*.youtube.com/watch?v=1234*" is malicious.

9. The client stores each response in the client cache (including the hash and the associated rating) and returns the final response to the browser plug-in 10. Subsequently, each time the user surfs to "youtube.com" or a video under the domain level, only a single query need be sent to the ORSP FE server relating to the video in question.

Figure 4:
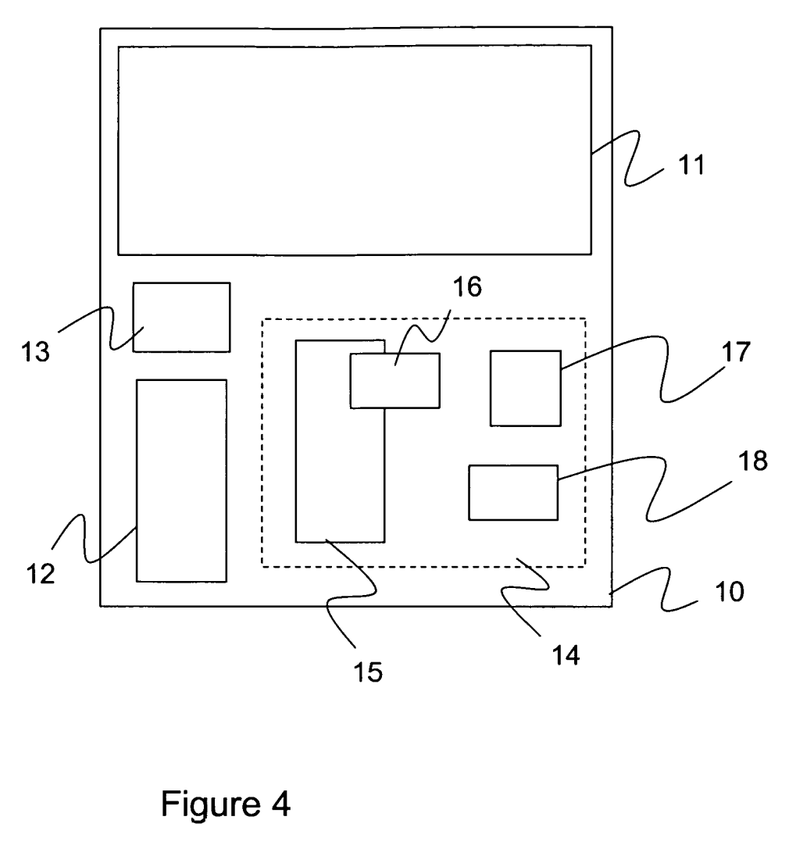
FIG. 4 illustrates schematically a client terminal configured to provide URL rating information.

FIG. 4 illustrates schematically a client terminal 10 suitable for use with the approach described above. By way of example, the terminal may be a PC, laptop computer, or mobile phone. It comprises a display 11, a user input unit 12, for example a keyboard, and an Internet interface 13. The terminal further comprises hardware and software components 14 for implementing a web browser 15, a URL rating specific browser plug-in 16, an ORSP client 17, and a memory cache 18 available to the ORSP client. The browser plug-in 16 is configured to implement the ORSP client functionality described above, whilst the memory 18 is configured to store the client cache.

Considering the components of the client 10 in more detail, the browser plugin 16 represents a "thin" component whose role is to identify and extract URLs from the browser 15, pass queries to the ORSP client 17, receive rating responses from the ORSP client, and update the browser display according to received ratings (including downloading/blocking web pages). The ORSP client 17 is responsible for parsing URLs, hashing components, querying the local cache 18, and querying the rating server. The ORSP client may be a service provided on the Windows™ platform, and communicates with the browser plugin via an appropriate Application Programming Interface (API). The local (client) cache is stored by the ORSP client 17 in the memory cache 18.

Figure 5:
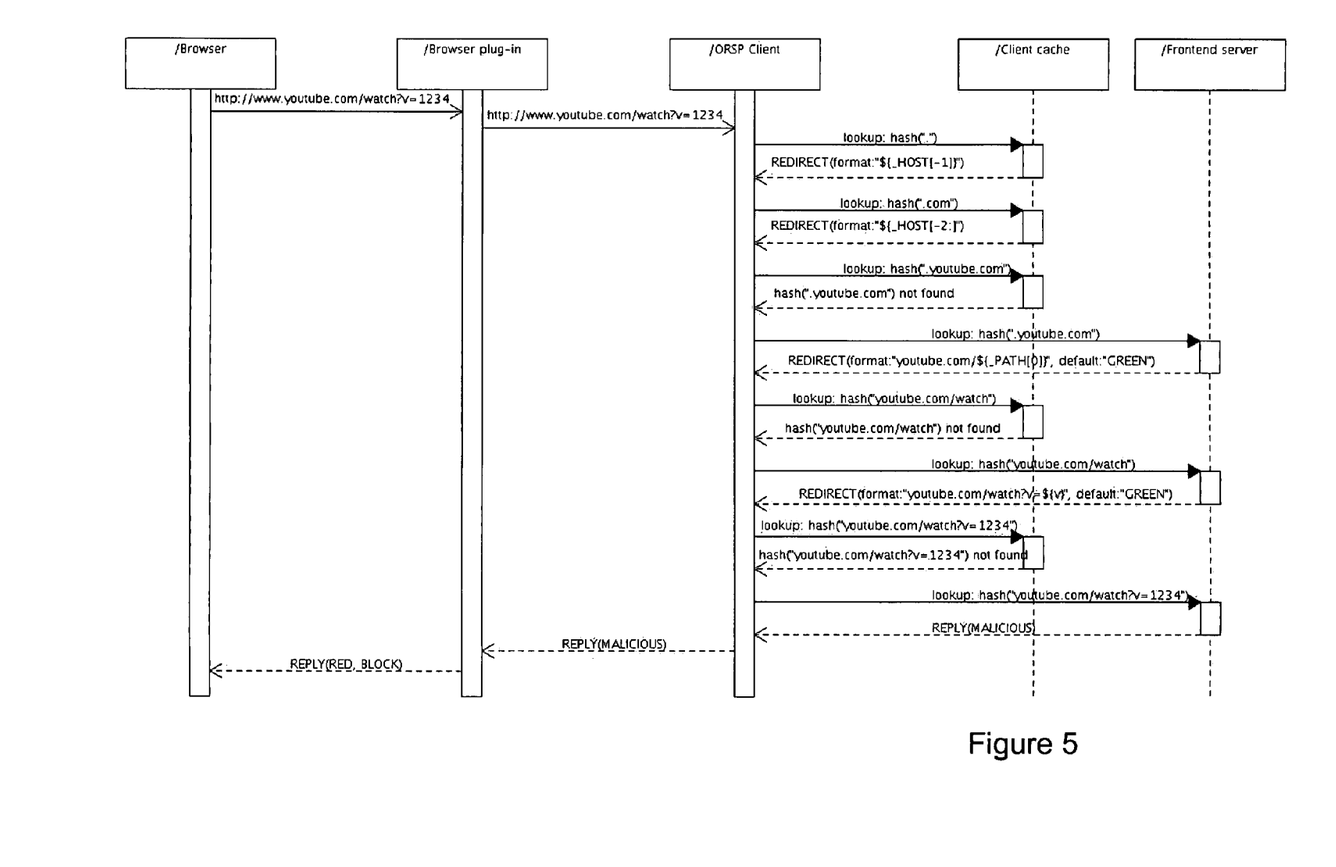
FIG. 5 illustrates in more detail the procedure of FIG. 3.

FIG. 5 illustrates signalling associated with this example, where the browser, browser plug-in, ORSP client (NRS-ORSP-Adapter), and client cache are all software components within the client, and the FE-Server and FE DB (database) are components, possibly distributed, of the rating server. In this example, a redirect message causes the ORSP client to re-query either the local cache or the rating server.

It will be appreciated that anyone snooping traffic between the client terminal and the rating server will only see hashed URL components, and not the components themselves. In the event that the rating server possesses a rating for a received hash, the rating server will be able to identify the corresponding URL component. In that case, it is unlikely that disclosure of the URL component is of concern to the user. Sensitive URL component are very unlikely to be know to the rating server.

It will also be appreciated by the person of skill in the art that various modifications may be made to the above described embodiment without departing from the scope of the present invention. For example, an initial sub-query sent from the client to the rating server may additionally include a hash of the complete URL. The rating server may then perform an initial "quick search" for that hash, returning a result immediately to the client if a rating for that URL exists. Only if a rating is not found does the server proceed to perform a look-up based on the domain level.

The ORSP client may be implemented as a standalone application on the client terminal on the client terminal. Alternatively, the ORSP may be implemented as a browser plugin, applet, etc.

The URL rating server may maintain a set of rating categories indicative of the trust associated with a rated URL. For example, the following six categories may be used:

1 Untested [GRAY]
2 Malicious [RED]
3 Unsafe [RED]
4 Suspect [YELLOW]
5 Safe [GREEN]
6 Trusted [GREEN]

The colour associated with each category defines a colour that is displayed in a "traffic light" trust indicator added to the browser buttons by the ORSP client.

A rating provided to the client by the URL rating server may include a "time-to-live" (TTL) value. This indicates to the client a duration for which the rating can be trusted, and is stored in the client cache. When a URL entered into the browser matches or includes a component that matches a hash for which the TTL has expired, the client will repeat the query procedure with the rating server, updating the cache entry according to the result. The client may also periodically initiate updates of expired cache entries.

Critical cache updates may be pushed to the client by the rating server. This may apply for example to newly discovered malicious domain names. Alternatively, such critical updates may be provided en bloc the next time that a client makes an ordinary query to the rating server.

It will be further appreciated that the rating procedure described here may be applied to rate URLs associated with application/services other than a web browser. For example, the procedure may be applied to rate URLs and web data contained within emails. In this case, a thin "plugin" type component may be implemented in an email client such as Microsoft Outlook™, with the component communicating with the ORSP client. The ORSP client may be shared by multiple applications and services.

The invention claimed is:

1. A method comprising:
1) identifying, at a client terminal, a Uniform Resource Identifier and at least three separate components of the Uniform Resource Identifier;
2) sending a query to a rating server over an IP network, the query including as a query string at least a first component of the identified Uniform Resource Identifier or a derivative of that first component;
3) receiving the query at the rating server and determining whether or not a rating exists for the query string and that a further query is required;
4) sending a response including a determined rating, or an indication that no rating exists, to the client terminal, the response including an indication that a further query is required;
5) in response to receiving the response at the client terminal, sending a further query to the rating server, the further query including as a query string said at least a first component and a further component of the identified Uniform Resource Identifier, or a derivative of the first and second components;
6) receiving the further query at the rating server and determining whether or not a rating exists for the query string;
7) in response to determining that a further query is required, repeating steps 4) to 6) through one or more further iterations, determining after each iteration whether or not a further query is required, until a query is received at the rating server for which no further query is required, adding for each iteration a further component of the Uniform Resource Identifier to the query string; and 8) in response to determining that no further query is required, sending a response including a determined rating, or an indication that no rating exists, to the client terminal; and receiving the response at the client terminal.

2. A method according to claim 1, wherein one or more of the queries comprises a derivative of a corresponding query string, and wherein at least one of the derivatives is obtained by applying a hashing function to the corresponding query string.

3. A method according to claim 1, wherein said at least a first component comprises a registered domain name or registered IP address.

4. A method according to claim 3, wherein each of said further component comprises at least one further sub-component prefixed to said at least a first component.

5. A method according to claim 1 and comprising, at the rating server, if it is determined that a rating exists for the query string and that a second or further component is required to refine the rating, including in the response a format definition for a further query.

6. A method according to claim 1 and comprising, upon receipt of a response at the client terminal, caching in a local cache any determined rating together with the associated query.

7. A method according to claim 6 and comprising, at the rating server, if it is determined that a rating exists for the query string and that a further component is required to refine the rating, including in the response a format definition for a further query and additionally caching in the local cache the format definition.

8. A method according to claim 6 and comprising, between steps 1) and 2), querying said local cache to determine whether or not it contains an entry for a component of the Uniform Resource Identifier and, if not, then including that component or its derivative as said first component or its derivative in said first, query, and, if so, then presenting the rating to a user and constructing said query string of said first query according to a specified format definition, said further query string comprising the data associated with the component of the Uniform Resource Identifier.

9. A method according to claim 1, wherein the client terminal comprises a web browser and the method further comprises displaying in a web browser window a determined rating.

10. A method according to claim 9 and comprising:

if a rating received by the client terminal indicates that the Uniform Resource Identifier is trusted, then downloading the data from that Uniform Resource Identifier into a web browser window, and if a rating received by the client terminal indicates that the Uniform Resource Identifier is malicious, then blocking the downloading of data from that Uniform Resource Identifier into a web browser window.

11. A method according to claim 1 and comprising including the Uniform Resource Identifier or a derivative of the Uniform Resource Identifier in said first query sent to the rating server.

12. A method according to claim 11 and comprising, at said rating server, determining whether or not a rating exists for the Uniform Resource Identifier or its derivative prior to determining whether or not a rating exists for the query string and, if so, then returning a response containing the rating, to the client terminal.

13. A method comprising:

receiving at a client terminal from a network server, ratings in respect of Uniform Resource Identifiers;

caching the received ratings at the client terminal within a client cache; and for a Uniform Resource Identifier identified at the client terminal for which a rating is required, 1) identifying a plurality of separate components of the Uniform Resource Identifier, 2) querying the client cache to determine whether or not it contains a rating for a Uniform Resource Identifier matching query string, the query string being a first component of the identified Uniform Resource Identifier, and whether a further query is required to the cache or to an external server, 3) if a further query is required to the cache, repeating step 2) for one or more iterations, extending the query string with a further component until either no further query is required, or a query is required to the external server;

4) if a further query is required to the external server, extending the query string with a further component and sending a query to the server, receiving a response indicating a rating for the query string or that no rating exists, and indicating whether or not a further query is required;

5) if a further query is required in step 4), repeating step 4) for one or more iterations, extending the query string with a further component until either no further query is required or there are no further components.

14. A method according to claim 13, wherein the extended Uniform Resource Identifier corresponds to the identified Uniform Resource Identifier.

15. A method according to claim 13 and comprising further extending the extended URI in dependence upon further results and repeating the query of the client cache or sending a query to the rating server.

16. A method according to claim 13, wherein a query sent to the rating server contains the complete identified Uniform Resource Identifier.

17. A non-transitory computer readable storage medium storing a program of instructions, execution of which by at least one processor, configures an apparatus to perform at least the functions of:

1) identifying, at a client terminal, a Uniform Resource Identifier and at least three separate components of the Uniform Resource Identifier;

2) sending a query to a rating server over an IP network, the query including as a query string at least a first component of the identified Uniform Resource Identifier or a derivative of that first component;

3) in response to receiving a response at the client terminal, wherein the response received at the client terminal includes an indication that a further query is required, sending a further query to the rating server, the further query including as a query string said at least a first component and a further component of the identified Uniform Resource Identifier, or a derivative of the at least a first and further components;

4) repeating steps 2) and 3) through one or more iterations until a response is received indicating that no further query is required, adding for each iteration a further component of the Uniform Resource Identifier to the query string;
5) depending upon a final rating or the absence of a rating, either allowing the client terminal to access data identified by the Uniform Resource Identifier or preventing access to that data or requesting a user decision.

18. A non-transitory computer readable storage medium storing a program of instructions, execution of which by a processor causes an apparatus to:
1) identify, at a client terminal, a Uniform Resource Identifier and at least three separate components of the Uniform Resource Identifier;
2) send a query to a rating server over an IP network, the query including as a query string at least a first component of the identified Uniform Resource Identifier or a derivative of that at least a first component;
3) in response to receiving a response at the client terminal, wherein the response received at the client terminal includes an indication that a further query is required, sending a further query to the rating server, the further query including as a query string said at least a first component and a further component of the identified Uniform Resource Identifier, or a derivative of the at least a first and further components;
4) repeat steps 2) and 3) through one or more iterations until a response is received indicating that no further query is required, adding for each iteration a further component of the Uniform Resource Identifier to the query string;
5) depending upon a final rating or the absence of a rating, selecting between allowing the client terminal to access data identified by the Uniform Resource Identifier, preventing access to that data, and requesting a user decision.

19. A method comprising:
1) maintaining at or in association with a server, a cache containing ratings for Uniform Resource Identifiers;
2) receiving at the server, from a client terminal, a query containing a queried Uniform Resource Identifier;
3) identifying a first component of said queried Uniform Resource Identifier and determining whether or not said cache contains an entry for a Uniform Resource Identifier matching said first component;
4) in response to a determination that the cache contains an entry which indicates that a further Uniform Resource Identifier component is required to rate the queried Uniform Resource Identifier, identifying such a second component and determining whether or not the cache contains an entry for a Uniform Resource Identifier which matches said first and second components;
5) repeating step 4) until either a final rating is obtained or it is determined that the queried Uniform Resource Identifier cannot be rated, with a further component of the Uniform Resource Identifier being added at each iteration; and
6) returning the determined ratings to the client terminal including any ratings determined for intermediate Uniform Resource Identifiers.

* * * * *